US007916666B2

(12) United States Patent
Yoon et al.

(10) Patent No.: US 7,916,666 B2
(45) Date of Patent: Mar. 29, 2011

(54) RELIABLE BROADCAST PROTOCOL AND APPARATUS FOR SENSOR NETWORKS

(75) Inventors: Chang-June Yoon, Edison, NJ (US); Alexander D. Wentworth, Hoboken, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 760 days.

(21) Appl. No.: 11/695,879

(22) Filed: Apr. 3, 2007

(65) Prior Publication Data

US 2008/0247408 A1 Oct. 9, 2008

(51) Int. Cl.
*H04L 12/28* (2006.01)
(52) U.S. Cl. ............. 370/255; 370/225; 370/256; 455/9; 455/16
(58) Field of Classification Search .................. 370/254, 370/326, 238, 255, 256, 394, 432; 455/16, 455/7, 9, 11.1, 12.1, 13.1, 15
See application file for complete search history.

(56) References Cited

U.S. PATENT DOCUMENTS

| | | | |
|---|---|---|---|
| 5,818,845 A | 10/1998 | Moura et al. | |
| 5,828,655 A | 10/1998 | Moura et al. | |
| 5,915,207 A | 6/1999 | Dao et al. | |
| 6,005,850 A | 12/1999 | Moura et al. | |
| 6,009,096 A | 12/1999 | Jaisingh et al. | |
| 6,684,081 B2 | 1/2004 | Sarkkinen et al. | |
| 6,757,518 B2 * | 6/2004 | Spratt et al. | 455/11.1 |
| 6,819,908 B2 * | 11/2004 | Spratt | 455/3.03 |
| 6,859,639 B2 * | 2/2005 | Spratt et al. | 455/11.1 |
| 6,873,850 B2 | 3/2005 | Dowling et al. | |
| 6,909,702 B2 | 6/2005 | Leung et al. | |
| 6,937,602 B2 | 8/2005 | Whitehill et al. | |
| 6,996,839 B1 | 2/2006 | Edwards | |
| 7,002,944 B2 | 2/2006 | Kats et al. | |

(Continued)

FOREIGN PATENT DOCUMENTS

EP 1564937 A2 8/2005

(Continued)

OTHER PUBLICATIONS

Guojun Wang et al., "Reliable Gossip-Based Broadcast Protocol in Mobile Ad Hoc Networks", Mobile Ad-Hoc and Sensor Networks, First International Conference, MSN 2005, Lecture Notes in Computer Science vol. 3794, pp. 207-218, 2005.

(Continued)

*Primary Examiner* — William Trost, IV
*Assistant Examiner* — Emmanuel Maglo
(74) *Attorney, Agent, or Firm* — Edell, Shapiro & Finnan, LLC

(57) ABSTRACT

A method for broadcasting messages in an ad hoc wireless network having a tree-based architecture is provided. When a node receives a broadcast message for re-broadcasting to other nodes in the network, it builds a list of identifiers of other nodes in the network from which the node requires reception of a broadcast message as an implicit acknowledgment that said other nodes in the network have received said broadcast message. The node builds this implicit acknowledgment list based on stored data pertaining to an existing tree-based topology of the network. After this list is built, the node re-broadcasts the broadcast message. Each node in the network executes this broadcasting protocol and in so doing a broadcast message quickly and efficiently propagates through the network with minimal redundancy and impact on the topology of the network.

43 Claims, 14 Drawing Sheets

U.S. PATENT DOCUMENTS

| | | | |
|---|---|---|---|
| 7,171,476 B2 * | 1/2007 | Maeda et al. | 709/227 |
| 7,184,421 B1 * | 2/2007 | Liu et al. | 370/338 |
| 7,327,683 B2 * | 2/2008 | Ogier et al. | 370/236 |
| 2002/0085537 A1 | 7/2002 | Carlsson et al. | |
| 2002/0137459 A1 * | 9/2002 | Ebata et al. | 455/16 |
| 2003/0003953 A1 | 1/2003 | Houplain | |
| 2003/0202494 A1 | 10/2003 | Drews et al. | |
| 2004/0023617 A1 * | 2/2004 | Mahany et al. | 455/41.1 |
| 2005/0041696 A1 | 2/2005 | Pekonen | |
| 2005/0152318 A1 | 7/2005 | Elbatt et al. | |
| 2005/0160270 A1 | 7/2005 | Goldberg et al. | |
| 2005/0207376 A1 | 9/2005 | Ashwood-Smith et al. | |
| 2006/0023712 A1 | 2/2006 | Shaheen | |
| 2006/0126535 A1 * | 6/2006 | Sherman | 370/254 |
| 2007/0121521 A1 * | 5/2007 | D'Amico et al. | 370/252 |
| 2009/0285136 A1 * | 11/2009 | Sun et al. | 370/310 |

FOREIGN PATENT DOCUMENTS

| | | |
|---|---|---|
| EP | 1631000 A1 | 3/2006 |
| WO | 01/41378 A1 | 6/2001 |
| WO | 02/25861 A1 | 3/2002 |
| WO | 2006/004363 A1 | 1/2006 |
| WO | 2006/012946 A2 | 2/2006 |

OTHER PUBLICATIONS

Vadim Drabkin et al., "Efficient Byzantine Broadcast in Wireless Ad-Hoc Networks", 2005 International Conference on Dependable Systems and Networks, pp. 160-169, 2005.

Wei Lou et al., "Localized Broadcasting in Mobile Ad Hoc Networks Using Neighbor Designation". Jul. 2003.

Rajkumar Arumugam et al., "SCRIBE: Self-Organized Contention and Routing in Intelligent Broadcast Environments", MILCOM 2003, 2003 IEEE Military Communications Conference (IEEE Cat. No. 03CH37500), pp. 567-572 vol. 1, 2003.

Brad Williams et al., "Comparison of Broadcasting Techniques for Mobile Ad Hoc Networks", Proc. Int. Symp. Mobile Ad Hoc Networking Comput., pp. 194-205, 2002.

Bhargav Bellur et al., "A Reliable, Efficient Topology Broadcast Protocol for Dynamic Networks", IEEE INFOCOM '99, Eighteenth Annual Joint Conference of the IEEE Computer and Communications Societies, The Future is Now (Cat. No. 99CH36320), pp. 178-186 vol. 1, 1999.

Chenxi Zhu et al., "A Five-Phase Reservation Protocol (FPRP) for Mobile Ad Hoc Networks", Wireless Networks vol. 7, pp. 371-384, 2001, Kluwer Academic Publishers, The Netherlands.

Elena Pagani et al., "Reliable Broadcast in Mobile Multihop Packet Networks", MOBICOM '97, Proceedings of the Third Annual ACM/IEEE International Conference on Mobile Computing and Networking, pp. 34-42, 1997.

Einar W. Vollset et al., "Design and Performance-Study of Crash-Tolerant Protocols for Broadcasting and Reaching Consensus in MANETs", 24th IEEE Symposium on Reliable Distributed Systems, pp. 166-175, 2005.

Gang Ding et al., "Reliable Broadcast in ZigBee Networks," Sensor and Ad Hoc Communications and Networks, 2005. IEEE Secon 2005. 2005 Second Annual IEEE Communications Society Conference in Santa Clara, CA, USA, Sep. 26-29, 2005, Piscataway, NJ, USA, IEEE, Sep. 26, 2005, pp. 510-520.

Search Report in counterpart European Application No. 08153385.3, dated Feb. 19, 2010.

* cited by examiner

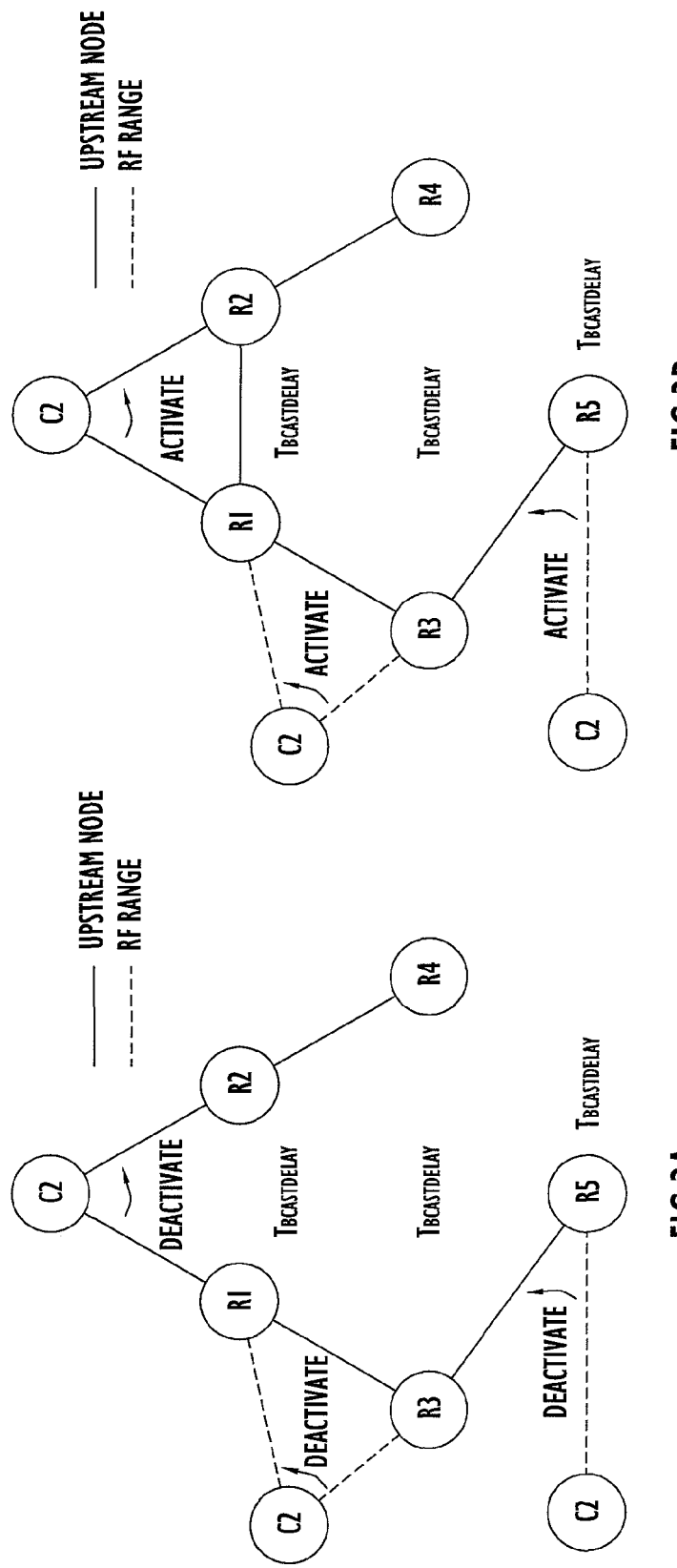

RELIABLE BROADCAST PROTOCOL AND APPARATUS FOR SENSOR NETWORKS

STATEMENT REGARDING FEDERALLY SPONSORED RESEARCH OR DEVELOPMENT

This invention was made under U.S. Government Contract No. DAAB07-03-9-K601. The U.S. Government may have certain rights in the invention.

BACKGROUND OF THE INVENTION

In an Unmanned Ground System (UGS) network, the Command and Control (C2) vehicle initiates formation of a mobile ad hoc wireless sensor network. One type of network architecture for a UGS network is a tree-based architecture. The tree-based network architecture takes advantage of the fact that sensor nodes are relatively static and, therefore, do not require frequent routing updates. The C2 vehicle (also called the C2 node), on the other hand, can leave and form the network at any time and any location.

The C2 node generates two important commands: an "Activate" command or message to form the network and a "Deactivate" command or message to dissolve the network. The C2 node initiates formation of the UGS network by broadcasting the "Activate" command, and can re-route the existing with the "Activate" command. When the C2 node leaves the UGS network, it broadcasts the "Deactivate" command to sensor nodes so that they reset their stored network topology data in preparation to receive the next "Activate" command.

Broadcasting is a common operation in mobile ad hoc networks (MANETs). Broadcasting is used in routing protocols to discover routes and in group communication operations. Broadcasting schemes for MANETs fall into four general categories: Blind flooding, area-based methods, probabilistic scheme, and neighborhood-knowledge-based methods. In flooding, a broadcast message is forwarded exactly once by every node in the network. Flooding is wasteful, especially in dense networks. Several efforts have targeted reducing the redundancy of flooding broadcasts.

In a blind flooding method each node receiving a copy of a broadcast message first checks whether it has already received it. If so, the node silently discards the message. If the message was received by the node for the first time then the node rebroadcasts it to all of its neighbors. Schemes such as probabilistic, counter-based, distance-based, and cluster-based, have been proposed to alleviate the drawbacks of redundant rebroadcasts.

In a probabilistic re-broadcasting approach, upon receiving a broadcast message for the first time, a node will rebroadcast it with probability P similar to the gossiping-based approach. The adaptive gossip probability is explored to make the protocol insensitive to a changing environment. However, the reliability of this approach depends on the probability P and the topology of the network.

A number of neighborhood knowledge-based algorithms use the connectivity of the node's k-hop neighbor information for some small integer (typically 2). The algorithms use this partial topology knowledge to reduce the number of nodes which relay the broadcast message. Two related solutions have been proposed: Self-Pruning and Dominant-Pruning. In the self-pruning-based broadcast protocol, each node collects neighborhood topology information (i.e., static information) by exchanging "Hello" message and extracts broadcast history information (i.e., dynamic information) from incoming broadcast messages. Each node decides its role in a specific broadcasting event: it is a forward node and forwards the broadcast message, or a non-forward node (i.e., is self-pruned) and discards the message silently. Collectively, forward nodes, including the source node, form a connected dominating set and ensure the coverage. A set of nodes is a dominating set if every node in the network is either in the set or a neighbor of a node in the set. Nodes are selected into this set in such a way that they cover a node's entire two-hop neighborhood. This requires substantial communication between neighboring nodes to update the neighbor information.

There are several drawbacks associated with using existing broadcast protocols in a UGS network. First, the existing broadcast protocols focus only on the efficient delivery of broadcast message, that is maximizing the probability the message reaches all nodes in the network. Impact of the significant network topology changes that are initiated by the received broadcast message is not considered in the conventional broadcast protocols. Second, the conventional broadcast protocols require large amount of information about the topological or geographical structure of the network when the network topology is changing. This creates significant overhead problems in a sensor network. Third, conventional broadcast and routing techniques are based on optimization at the individual layer (namely link layer or network layer). As a result, neighbor discovery creates racing problems in the network routing updates. Finally, conventional broadcast techniques lead to unwanted power consumption in the nodes which is a significant problem in battery-operated nodes.

There is room for significant improvement in broadcast protocols for use in wireless networks, particularly wireless sensor networks.

SUMMARY OF THE INVENTION

Briefly, a method is provided broadcasting messages in an ad hoc wireless network having a tree-based architecture. When a node receives a broadcast message for re-broadcasting to other nodes in the network, it builds a list of identifiers of other nodes in the network from which the node requires reception of a broadcast message as an implicit acknowledgment that said other nodes in the network have received said broadcast message. The node builds this implicit acknowledgment list based on stored data pertaining to an existing tree-based topology of the network. After this list is built, the node re-broadcasts the broadcast message. Each node in the network executes this broadcasting protocol and in so doing a broadcast message quickly and efficiently propagates through the network with minimal redundancy and impact on the topology of the network.

BRIEF DESCRIPTION OF THE DRAWINGS

FIG. 3A illustrates a conventional network de-activation process for a tree-based network.

DETAILED DESCRIPTION

Figure 1:
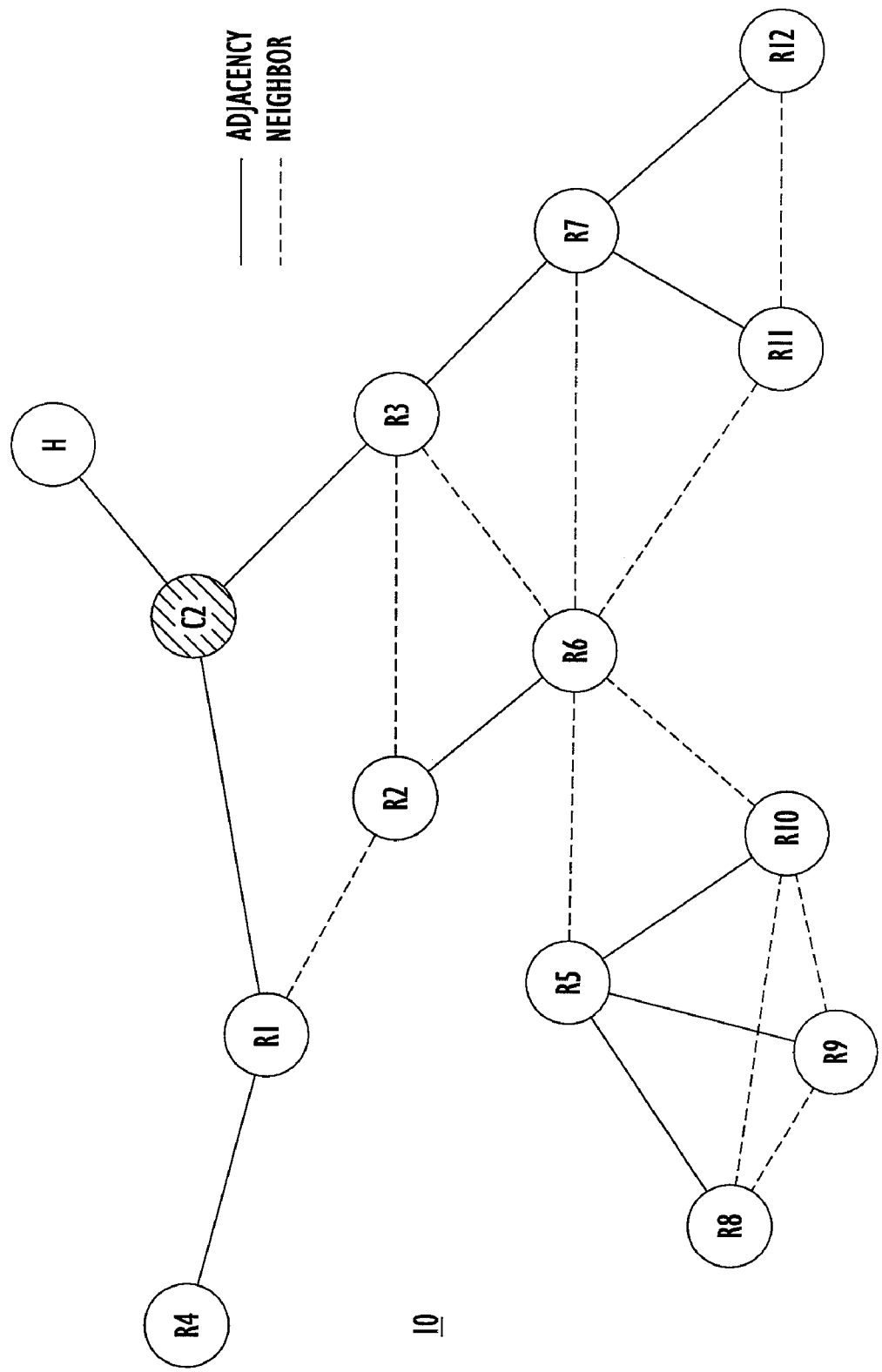
FIG. 1 is a block diagram of a conventional tree-based network architecture for a mobile wireless ad hoc network.

FIG. 1 illustrates a conventional wireless ad-hoc network 10 having a tree-based network topology. The network 10 comprises sensor nodes R1, R2, . . . , R12 and a root node C2. A host computing device H connects to the network 10 at the C2 node. The host H may be any computing device that is used to set up as well as receive and analyze data gathered by the nodes in the network 10. The host H may connect to any node, and when doing so, that node then becomes a root node (C2 node) for the network. The host device H may connect by wired or wireless means to the root node. It should be understood that any node in the network may be connected to a host device H. Furthermore, any node with a host device can become the C2 node if an activation command supplied by its host device.

Each node in the tree-based network 10, other than the root node C2, has an upstream node that attaches it to the tree. Also, each node in is itself the root of a sub-tree that includes that node and all of the nodes downstream from it. The tree-based topology may need to be updated because of the root node C2 is mobile and because the deployment environment of the network may change. Thus, a node can be an upstream node, a downstream node or a neighbor node with respect to another node in the network 10. For example, Node R7 is an upstream node with respect to node R12 and node R12 is a downstream node with respect to node R7. On the other hand, node R6 is a neighbor node to node R7 and vice versa. The nodes may be sensor devices that form a UGS network, for example.

Formation of the network is primarily driven by inputs through a process called "neighbor discovery" whereby nodes learn about the existence of other nodes. Neighbor discovery involves a node transmitting a so-called "Hello" message that includes provides neighbor information when changes in the status of the bi-directional neighbor links are detected. When neighbor information updates are received, a node stores them in its local neighbor database. The initial neighbor database consumes the most extensive computation time and its update occurs rarely since most of the nodes, except the root node C2, are stationary in an UGS network.

In general, sensor networking requires two functions:
Initial Network Formation to allow the sensor nodes to detect the neighbors and form the tree-based topology at startup.
Network Maintenance to perform on-going adaptation to changes in the network environment.

The C2 node broadcasts two command messages to the sensor nodes: (1) "Activate" and (2) "Deactivate". The "Activate" message is an initiation network formation message initiated by the C2 node to make the sensor nodes that are in an "Out-Of-Net" state start to create the tree-based topology. The C2 node always transmits a "Hello" message, e.g., Hello (C2), indicating that it is forming a network thereby causing a node to switch to the so-called "In-Net" state. If a sensor network already exists, then the C2 node net-time-synchronizes to the existing network and broadcasts an "Activate" message so that sensor nodes re-route to the root node C2.

The purpose of the "Deactivate" message is to allow the C2 node to place the entire network, including sensors, into a deactivated or dormant state. The dormant state is intended to conserve battery power and prevent spoofing when the C2 node is not present to receive data. The "Deactivate" message requires sensor nodes to purge (or clear) their tree-based topology information and start to transmit the "Hello" message that indicates there is no-upstream-node, often called referred to as the "Hello(0)" message.

Initial Network Formation

Upon initial network formation, a sensor node initializes its net formation database and waits for the "Activate" broadcast message initiated from the C2 node, while building a bi-directional neighbor table by exchanging the "Hello" messages with other nodes. Upon the reception of the "Activate" message, a node selects the best upstream node candidate from the its net formation database and attempts to execute a so-called "affiliation operation" in which it transmits a join message to a candidate upstream node and waits to receive an acceptance message from that node indicating that the candidate upstream node has accepted and registered that node as one of its downstream nodes. Once the affiliation process is successful, the upstream node (i.e. adjacency) is selected and the node now enters the "In-Net" state. The net formation database contains the tree-based topology information.

Network Maintenance—Local Repair

Figure 2B:
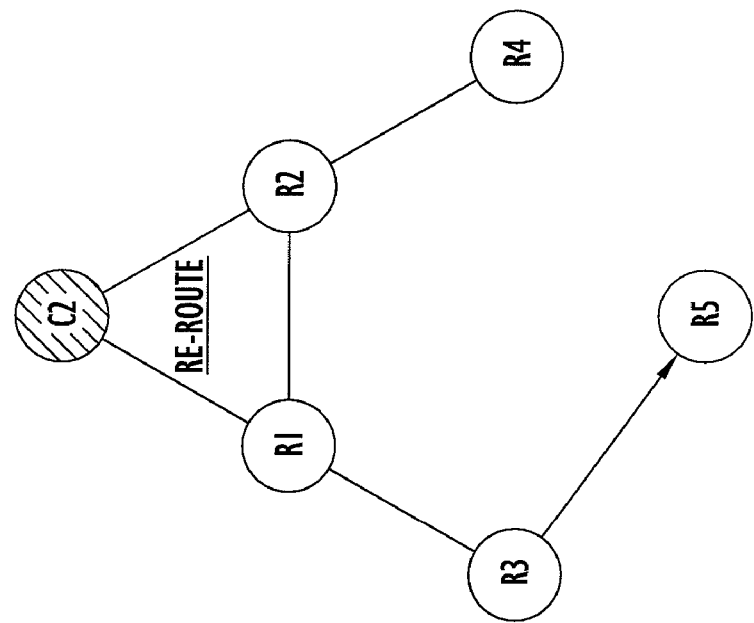
FIG. 2B illustrates a conventional re-route process for a tree-based network.
Figure 2A:
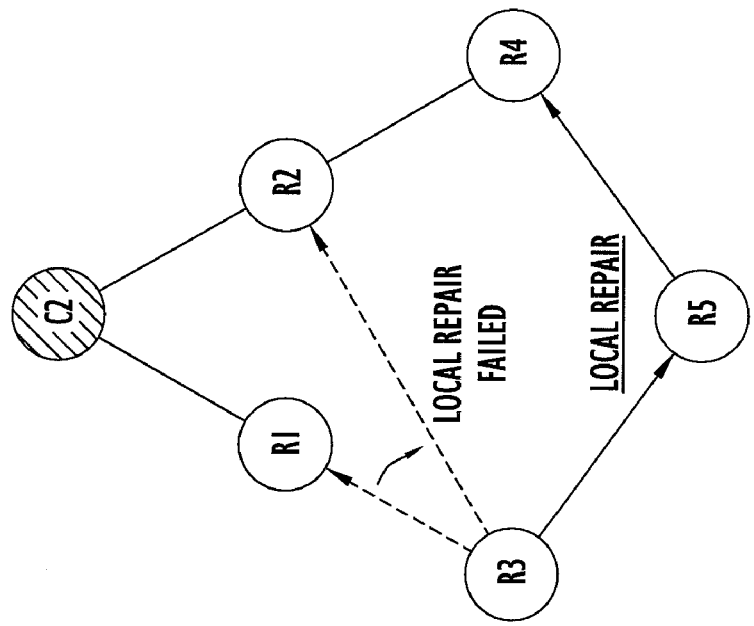
FIG. 2A illustrates a conventional local repair process for a tree-based network.

The procedure for a so-called "tree repair" is depicted in FIG. 2A. In a tree repair process, an attempt is first made to locally repair the tree-based network architecture as long as an upstream node candidate is available by re-affiliating with another upstream node. This is called a "local tree repair" process. This process ends once the node is able to affiliate with a new upstream node. The adjacency node list is updated after the upstream node is changed.

The local tree repair operation, for node R3 as an example, terminates (fails) when the list of upstream node candidates (R1, R2 and R4) available for tree affiliation has been exhausted without successful repair. The local node sets the upstream node and the C2 node to 0 in the net formation database and initiates the neighbor discovery process, transmitting a "Hello" message that indicates no-upstream-node, the aforementioned "Hello(0)" message. Receiving Hello(0) message from its upstream node R3, the sub-tree node R5 starts to re-affiliate to node R4 using the local tree repair process.

Network Maintenance—Re-Route

In a "re-route" network maintenance procedure shown in FIG. 2B, one of the sensor nodes, e.g., node R2, is designated as a root node proxy in the absence of the C2 node. At some point later in time, when the C2 node wants to be the root of the existing networking tree, the C2 node broadcasts an "Activate" message to the sensor network. Upon receiving the "Activate" message, nodes R1 and R2 execute the re-affiliation procedure to the C2 node, while the remaining nodes keep the existing upstream node, for example. The re-route process could make the net formation procedure update significantly dependent upon the C2 node's location. When a node changes the upstream node, it starts transmitting "Hello (0)" messages because the existing upstream node is not valid. Receiving the Hello(0) message, downstream nodes may start local repair processes. This will trigger unwanted overhead in the network. A more timely approach is needed for repair.

When the C2 node does not move to a new location from where it formed the tree-based topology, the tree-based topology information may be used to broadcast efficiently. Otherwise, the use of "obsolete" or "incorrect" tree-based topology information will make the messaging broadcast scheme extremely unreliable and inefficient.

FIGS. 3A and 3B illustrate scenarios of possible locations of the C2 node from where it may broadcast a message to the sensor network. FIG. 3A illustrates scenarios when the C2 node broadcasts a Deactivate message from various locations with respect to the network and FIG. 3B illustrates scenarios when the C2 node broadcasts an Activate message from various locations.

There are two critical events to update the routing tree topology after the local node receives the broadcast ("Activate" and "Deactivate")command messages. One event is an external event and the other is an internal event.

The external event occurs when a node is in the "Out-Of-Net" state and it transmits a "Hello(0)" neighbor discovery message. Upon a local node receiving the "Hello(0)" message from an upstream node the local node clears its tree-topology data and starts the local repair process whereby it looks for another upstream node from available candidate upstream nodes.

The internal event occurs when a node receives the Activate" or "Deactivate" broadcast commands and the node needs to determine a new route (re-routing process) in order to find a better upstream node.

Using conventional techniques, the route would be updated by the change of neighbor information, local repair or both without using any information pertaining to the overall tree-based topology. This results in increased overhead for route discovery and maintenance and could create loops of local repair events.

According to the present invention, a cross-layer optimization protocol is provided to for a reliable and robust sensor system.

According to one aspect of the invention, a tree-based broadcast protocol with "implicit acknowledgment" ("implicit ACK") is provided. This broadcast protocol can be used as a basis for an overall more robust and stable networking protocol. The tree-based broadcast protocol with implicit ACK generally operates as follows. When a node receives a broadcast message for re-broadcasting to other nodes in the network, it builds a list of identifiers of other nodes in the network from which the node requires reception of a broadcast message as an implicit acknowledgment that said other nodes in the network have received said broadcast message. The node builds this implicit acknowledgment list based on stored data pertaining to an existing tree-based topology of the network. After this list is built, the node re-broadcasts the broadcast message. Each node in the network executes this broadcasting protocol and in so doing a broadcast message quickly and efficiently propagates through the network with minimal redundancy and impact on the topology of the network.

Figure 4:
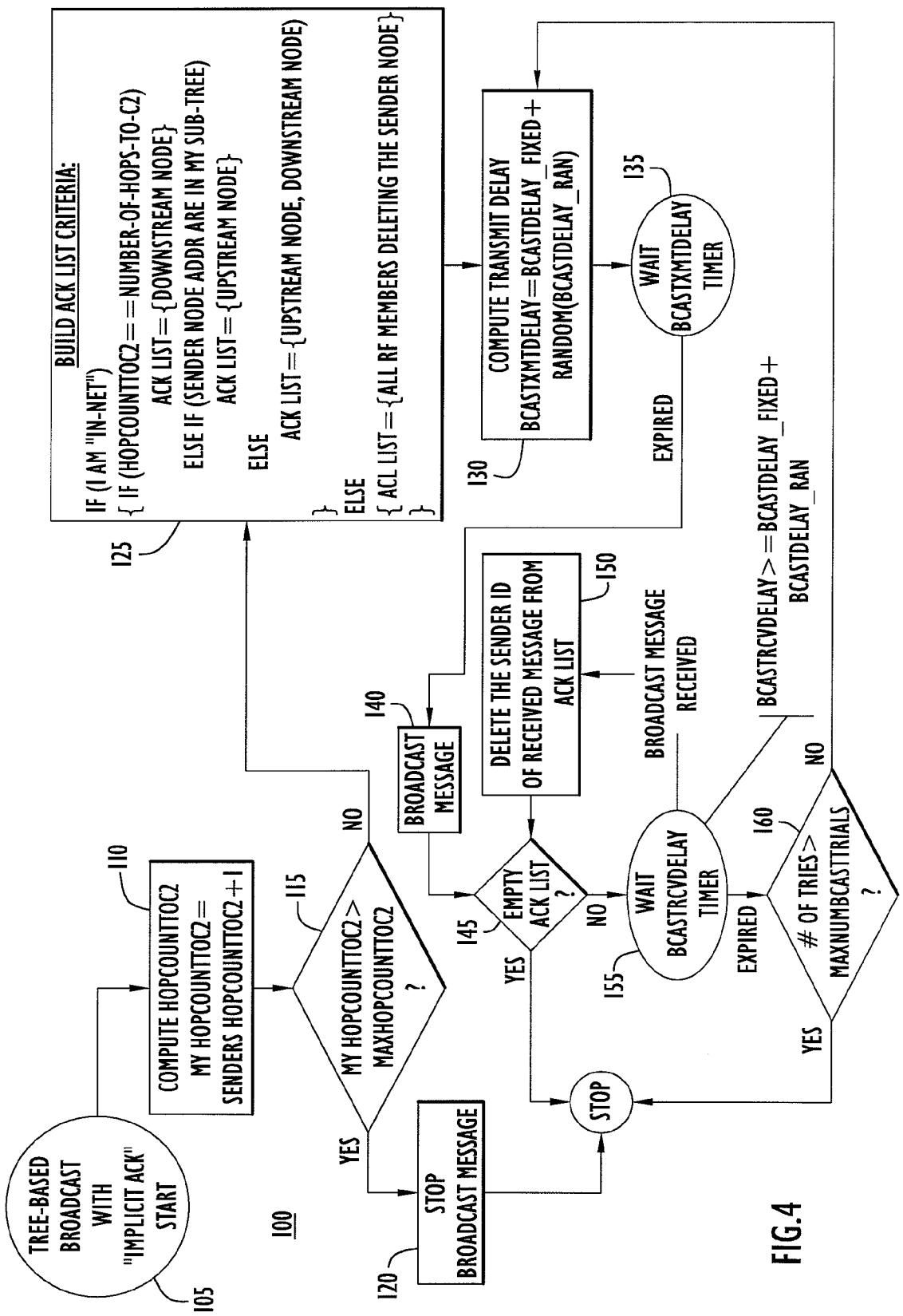
FIG. 4 is a flow chart of a tree-based broadcast process according to one embodiment of the invention.

With reference to FIG. 4, the tree-based broadcast protocol with "implicit ACK" according to one embodiment of the invention is described in greater detail. Command messages, such as the "Deactivate" and "Activate" broadcast command messages contain the following fields, which may be included in a request-to-send (RTS) packet:
C2 Address
Sender Node Address
HopCountToC2

The RTS packet is a short burst and as a result contributes to reducing the collision problem encountered in conventional k-hop neighbor-based-information approach.

The tree-based broadcast protocol with "implicit ACK" is shown generally at 100 in FIG. 4 and is designed to exploit the existing tree-based topology information and local node's neighbor table for reliable and efficient broadcast. At 105, the C2 node can broadcast a command message (e.g., an Activate or a Deactivate message) at any time and at any location with respect to sensor nodes in the network. When the C2 node broadcasts a command message, it sets HopCountToC2 to 0 in the command message. At 110, a local sensor node in the network receives the broadcast message. At this time, the local node does not know whether the broadcast message was received directly from the C2 node or another node in the network. Thus, at 110 the local node determines the source node of the received broadcast message using its stored data representing the existing tree-based topology of the network. Also at 110, using the data extracted from the received message, the local node updates its node hop count to the C2 node, My HopCountToC2. This computation is made by adding "1" to the sender's HopCountToC2.

At 115, the local node compares its node hop count, My HopCountToC2, with a configured parameter of a maximum number of node hops to the C2 node, MaxHopCountToC2. If the local node determines at 115 that My HopCountToC2 is greater than MaxHopCountToC2, then the process goes to 120 to stop the re-broadcasting process thereby minimizing redundant broadcasts in the UGS network. The value of MaxHopCountToC2 controls how fast the commands propagate throughout the networks. Otherwise, if at 115 the local node determines that My HopCountToC2 is less than or equal to MaxHopCountToC2, then the process continues to 125 wherein the local node builds a list of nodes that it should transmit an ACK message to depending on certain criteria. This list is referred to herein as an ACK list. As explained hereinafter, the local node uses this ACK list to keep track of which other nodes from which the local node is required to receive a broadcast message as an implicit acknowledgement that the other nodes have received the broadcast message. The local node will delete entries from this list after it begins to re-broadcast the broadcast message until the ACK list is empty of a maximum number of broadcast attempts is met, as represented by the loop 130-160.

The conventional approach to building an ACK list involves the local node deleting the sender node address (identifier) from its list of neighbors. When a local node receives a rebroadcast of the ACK message from a node in its neighbor list, the local node considers that an "implicit" acknowledgment from the neighbor node that the neighbor node received the broadcast message re-broadcasted from the local node.

In accordance with an aspect of the present invention, a tree-based broadcast with implicit ACK is provided that exploits the tree-based topology data stored in the nodes for a more reliable and efficient broadcast mechanism. At 125, the local node further analyzes the data derived from the received broadcast message and determines whether the existing tree-based topology for the network is still valid and generates the ACK list accordingly. That is, at 125, the local node builds a list of identifiers of other nodes in the network from which the local node requires reception of a broadcast message as an implicit acknowledgment that the other nodes in the network have received the broadcast message.

The pseudo-code logic for the process occurring at 125 is as follows.

---

```
If local node is "In-Net"
    If (HopCountToC2 = = Number-Of-Hops-To-C2)
        ACK List = {Downstream Node}
    else if (Sender Node ID is among My Sub-Tree Member)
        ACK List = {Upstream Node}
    else
        ACK List = {Upstream Node and Downstream Node}
If local node is "Out-Of-Net"
    ACK List = {All RF Neighbors deleting Sender Node ID}
```

---

To explain further, at 125, the local node first determines whether the sender node address is a node address that is in the local node's stored network formation database. If the sender node is in the local node's database, then the local node determines that it is in the "In-Net" state. When the local node is "In-Net", the local node builds its ACK list depending upon whether or not the computed HopCountToC2 (at 110) equals the NumberOfHopsToC2 stored in its network formation database for the existing tree-based topology of the network.

When the local node determines that the computed HopCountToC2 equals NumberOfHopsToC2, the local node knows that the existing tree-based network topology is still valid. In this case, the local node adds to its ACK list the identifier of the downstream node(s) in the existing tree-based network topology. On the other hand, if the local node determines that HopCountToC2 does not equal NumberOfHopsToC2, then the local node determines if the identifier or address of the source node from which the local node received the broadcast message is a node that is one of the local node's sub-tree members. If the local node determines that the sender node address is in the local node's sub-tree, then the local node knows that the C2 node has moved and has broadcasted the message through a downstream node in the existing tree-based topology with respect to the local. In this case, the local node assigns to its ACK list the identifier of the upstream node(s) in the existing tree-based network topology.

Further still, if the local node determines that HopCountToC2 does not equal NumberOfHopsToC2 and the sender node address is not in the local node's sub-tree, then the local node assigns the identifiers of both upstream and downstream nodes to its ACK list.

Finally, when a local node determines that the sender node address is an address that is not in the network formation database for the existing tree-based topology, the local node is in an "Out-Of-Net" state and therefore builds an ACK list that contains all nodes of the network except the sender node. This is the conventional broadcast with "implicit ACK" protocol.

After the local node builds the ACK list in 125, the local node computes a transmit delay interval, BcastXmtDelay based on a first fixed (but programmable) value and a second random value: BcastXmtDelay=BcastDelay_fixed+(BcastDelay_ran), where BcastDelay_fixed is the first fixed value and BcastDelay_ran is a second random value. The BcastDelay_fixed value is configured or programmed in local node so as to avoid or minimize collisions of broadcast messages from neighbor nodes.

After computing the transmit delay interval, the local node waits a period of time equal to the transmit delay interval at 135, and transmits the broadcast message (in other words re-broadcasts the broadcast message it received) at the expiration of the BcastXmtDelay time interval, at 140.

In the course of the broadcast message propagating through the network, each node keeps track of those nodes from which it has received a broadcast message, and deletes the address or identifier of that sender node from its ACK list until its ACK list is empty.

Thus, the local node performs the procedure represented by the loop at 145, 150 and 155 until the ACK list is empty or a broadcast receive delay time interval, BcastRcvDelay, expires. The BcastRcvDelay time interval allows the local node to receive neighbor nodes' re-broadcasted messages, and also takes into account signal propagation delay. For example, the BcastRcvDelay time interval may be computed from the first fixed value and the second random value referred to above, according to the computation:

$$BcastRcvDelay=1.1*(BcastDelay\_fixed+BcastDelay\_ran)$$

When the local node determines at the expiration of the BcastRcvDelay time interval that the ACK List is not empty, the process continues to 130, 135 and 140 such that the local node continues to broadcast the message. This loop continues for up to a maximum number of broadcast attempts, MaxNumBcastTrials, at which point the procedure 100 terminates even if the implicit ACK did not complete fully.

Figure 5:
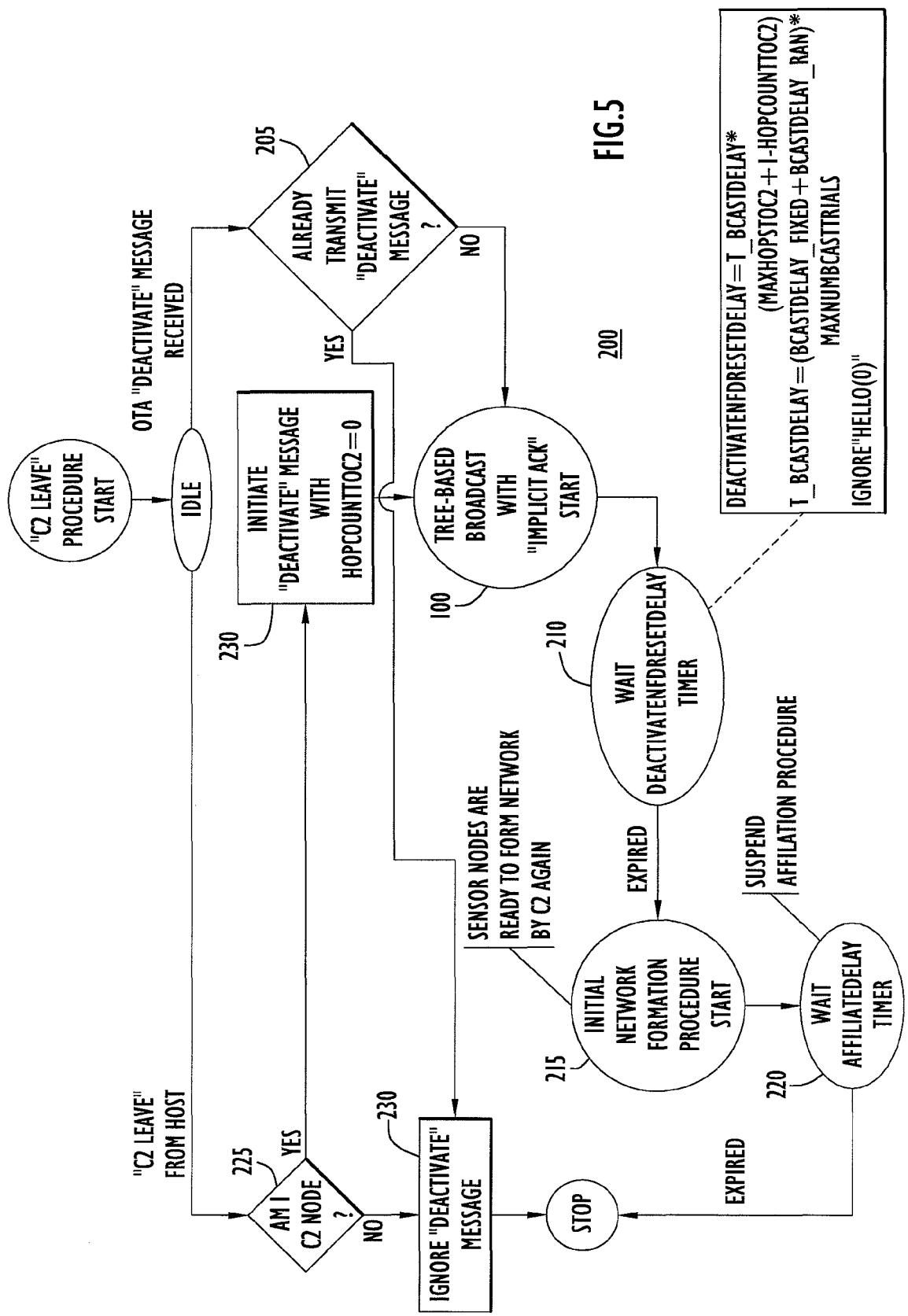
FIG. 5 is a flow chart of a network de-activation process according to an embodiment of the invention.

Turning to FIG. 5, a network deactivation procedure 200 is described in accordance with a further aspect of the present invention that is more robust and stable than procedures heretofore known and prevents unnecessary message routing throughout the network.

After the C2 node has initiated and formed the network, the C2 node may decide to leave the network at any time. When the C2 node leaves the network, it broadcasts a "Deactivate" command message to the network at any location (as shown in FIG. 3) to command all sensor nodes to purge their existing tree-based topology. Sensor nodes closer to the C2 node will receive the "Deactivate" message first. If they start to purge their topology database and transmit the neighbor discovery packet "Hello(0)" indicating that they purged their database, then their downstream nodes will start the "local repair" procedure because they have not yet received the "Deactivate" message. This would trigger the neighboring nodes to execute unnecessary local repair procedures, causing a racing problem and creating significant message overhead among the sensor nodes. The process flow that is performed when a local node receives an over-the-air (OTA) Deactivate message is shown on the right side of FIG. 5.

It is also possible that a node may be the C2 node and receive a "C2 Leave" message from the host device rather than from another node. This situation is shown on the left side of FIG. 5.

The right side of the flow chart shown in FIG. 5 is described first. When a local node receives an OTA Deactivate message, at 205, the local node determines whether it has already re-broadcasted the received Deactivate message or whether this is the first time it will re-broadcast it. When the local node determines that it has not already re-broadcasted the Deactivate message, then the local node performs the tree-based broadcast with implicit ACK procedure 100 shown in FIG. 4 with respect to the re-broadcasting of the Deactivate message.

After the procedure 100 is completed with the Deactivate message, then the local node waits a deactivate reset delay time interval, DeactivateNfdResetDelay, at 210 before it purges stored tree-based network topology database. A local node computes the DeactivateNfdResetDelay timer using the its HopCountToC2 and a broadcast delay value, TBcastDelay, using the computation:

$$\text{Deactivate}\textit{Nfd}\text{ResetDelay} = T\text{BcastDelay} * (\text{MaxHopsTo}C2 + 1 - \text{HopCountTo}C2)$$

where $$\text{BcastDelay} = (\text{BcastDelay\_fixed} + \text{BcastDelay\_ran}) * \text{MaxNumBcastTrials}$$

The DeactivateNfdResetDelay timer allows leaf nodes to reset their network topology database first, then their Upstream Node and reset the network topology databases and so on throughout the entire network. During the transition waiting period set by the DeactivateNfdResetDelay timer, a local node ignores all Hello(0) messages it receives and thus will not invoke a local repair procedure.

Upon expiration of the DeactivateNfdResetDelay timer, at 215 the local node clears its network topology database so that it is in the "Out-of-Net" state and ready to form a new network topology from a C2 node. Thereafter, at 220 the local node activates an affiliate delay timer, AffiliateDelay, to prevent executing an unwanted affiliation procedure. The AffiliateDelay timer may be based on the broadcast delay time interval according to the equation:

$$\text{AffiliateDelay} = T\text{BcastDelay} * (\text{MaxHopsTo}C2 + 1)$$

When a node receives a "C2 Leave" message from a host device, the process follows the left side of FIG. 5, where at 225, the node determines whether it is the C2 node. If the node is the C2 node, then at 230 it generates a Deactivate message (with HopCountToC2=0) and broadcasts it into the network according to the procedure 100 shown in FIG. 4. Otherwise, if the local node is not the C2 node, then the process continues to 230.

Likewise, when at 205 a local node determines that it has already re-broadcasted the Deactivate message, the process continues to 230. At 230, the local node ignores the Deactivate message received either OTA or from a host device.

The total time needed for the Deactivate command to propagate through a network using the procedure shown in FIG. 5 is:

$$\text{DeactivateNetConvergeTime} = 2 * T\text{BcastDelay} * (\text{MaxHopsTo}C2 + 1)$$

Figure 6:
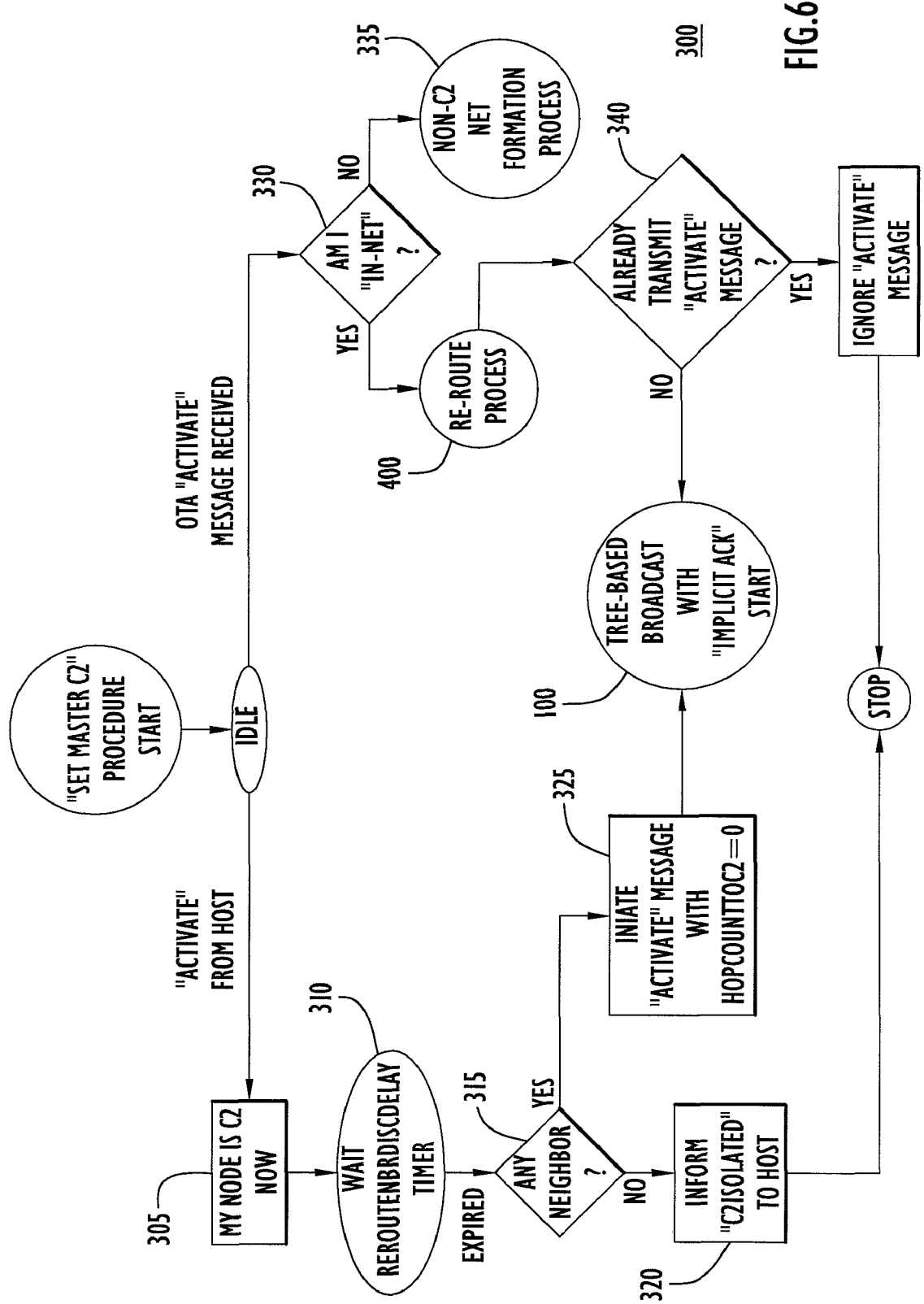
FIG. 6 is a flow chart of a network activation process according to an embodiment of the invention.

Turning to FIG. 6, a process is described for network formation or activation procedure 300 according to an embodiment of the invention. The purpose of the Activate message is to provide the C2 node with the ability to form the network. The left side of FIG. 6 illustrates the process flow when a local node receives the Activate command from a host device. When a local node receives an Activate message from the host device, it becomes the C2 node. The right side of FIG. 6 illustrates the process flow when the local node receives an OTA Activate message.

The left side of the FIG. 6 is described first. Again, when a local node receives the Activate message from the host, at 305 it configures itself as the C2 node. If there is an existing network, the C2 node will net-time-synchronize with the existing network at 305. Then, at 310, the C2 node waits a re-route discovery delay time interval, RerouteNbrDiscDelay, during which the local node (now the C2 node) attempts to find as many neighbor nodes as possible through the exchange of Hello packets, before engaging in the neighbor discovery and affiliation procedure. After the RerouteNbrDiscDelay interval, at 315 the node determines whether it has detected any neighbor nodes. If the C2 node has no neighbor(s), then at 320 the node sends a message to the host indicating the node is isolated. This message is known as the "C2Isolated" message. Otherwise, when the node has discovered neighbor nodes during the RerouteNbrDiscDelay interval, at 325 the node generates an Activate message (setting HopCountToC2 to 0) and broadcasts this message using the tree-based broadcast with implicit ACK procedure 100 shown in FIG. 4.

At 330 after a node receives an OTA Activate message, the node determines whether or not it is "In-Net", that is whether it is has already received the OTA broadcast message. If the node has already received the OTA broadcast message and therefore is already part of a network, the node proceeds to execute a re-route process 400, described in detail hereinafter in connection with FIG. 7. On the other hand, the first time the node receives the Activate message it is in the "Out-of-Net" state and at 335 it initiates a network formation process. At 340 the node determines whether it has already re-broadcasted the Activate message. If it has, then at 345 it ignores the received Activate message. If the node has not yet re-broadcasted the Activate message, then it performs the tree-based broadcast with implicit ACK procedure 100 shown in FIG. 4.

Figure 7:
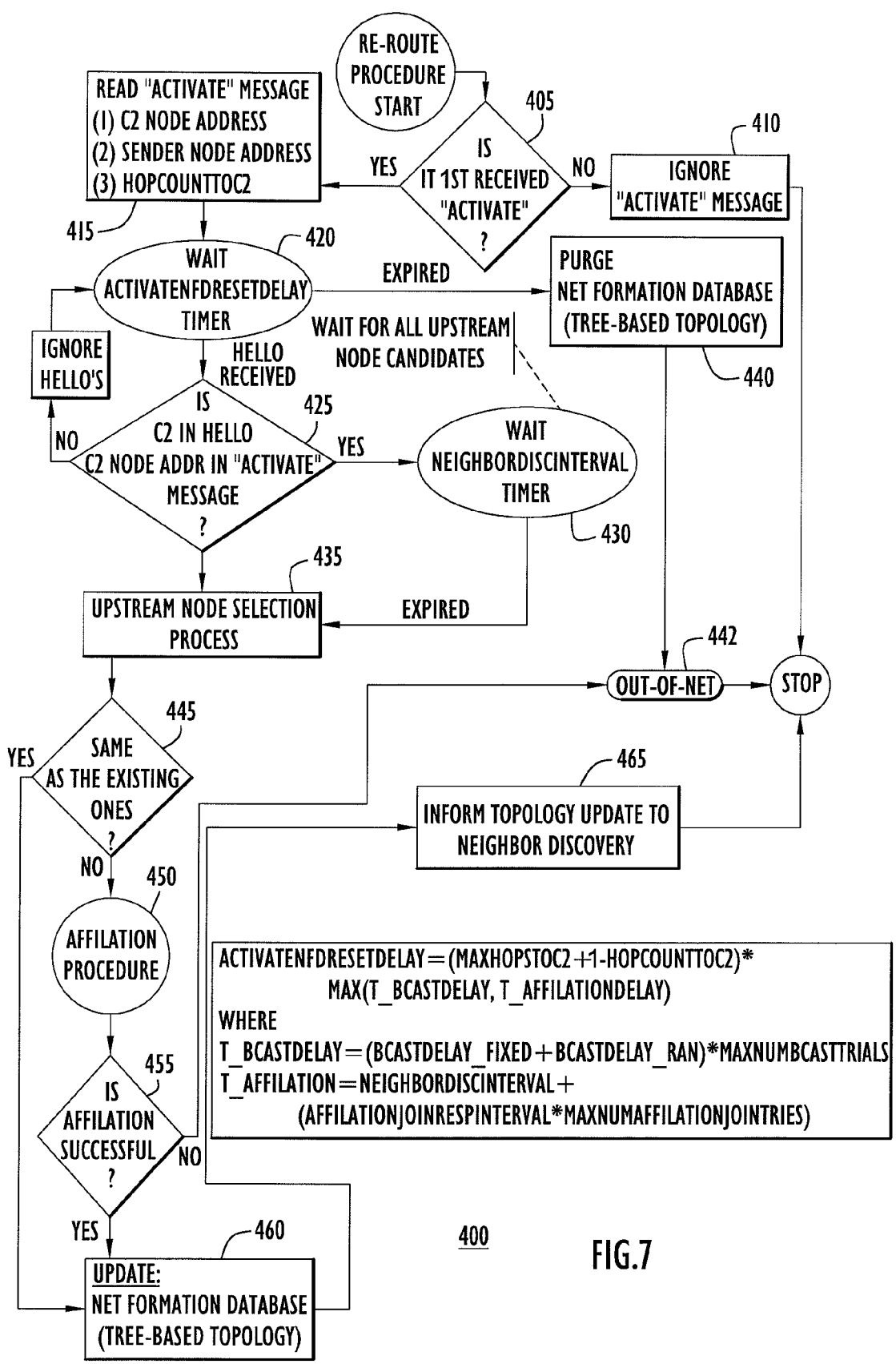
FIG. 7 is a flow chart of a re-routing process according to an embodiment of the invention.

Turning to FIG. 7, the re-route process 400 is now described. At 405, the node determines whether the received Activate message is the first one that it received. If it is not the first message, then at 410 the node ignores it. On the other hand, if it is the first time it has received the Activate message, then at 415 the node reads the Activate message to extract the C2 node address, the sender node address and the HopCountToC2. Then, at 420, the local node computes an activate reset delay time interval, ActivateNfdRestDelay. The ActivateNfdResetDelay timer at the local node is computed by:

$$\text{ActivateNfdResetDelay} = (\text{MaxHopsTo}C2 + 1 - \text{HopCountTo}C2) * \text{Max}(T\text{BcastDelay}, T\text{AffiliationDelay});$$

where TBcastDelay=(BcastDelay_fixed+BcastDelay_ran) *MaxNumBcastTrials and TAffiliationDelay is the affiliation delay time interval computed as:

$$T\text{AffiliationDelay} = \text{NeighborDiscInterval} + \text{AffiliationResInterval} * \text{MaxNumAffiliationJoinTries},$$

where NeighborDiscInterval is a neighbor discovery time interval, AffiliatonResInterval is an affiliation reset interval and MaxNumAffiliationJoinTries is a maximum number of affiliation join attempts.

While waiting for expiration of the ActivateNfdResetDelay timer, the node receives "Hello" neighbor discovery message and determines whether the C2 node address in the received neighbor discovery message is same as that of the first "Activate" message. If no neighbor discovery message is received (having a matching C2 node address) before the ActivateNfdResetDelay timer expires, then at 440 the node purges its stored network formation (topology) data and goes into the "Out-of-Net" state at 442, ready to re-affiliate. On the other hand, when a neighbor discovery message is received that has a matching C2 node address, then the process continues to 430 where the node waits for expiration of the NeighborDiscInterval timer, and then at 435 executes a upstream node selection process. The NeighborDiscInterval timer allows for the neighbor discovery process to achieve adequate discovery before making an upstream node selection. Using knowledge of its neighbor nodes, the node then selects one of these neighbor nodes to be its upstream node. At 445, it determines whether the newly selected upstream node is the same as the upstream node that it had been using. If it is a different upstream node that is selected, then at 450 the node executes the affiliation process to join the network with that new upstream node. On the other hand, if it is the same upstream node, then the node uses its existing network topology data and the process skips to 460. If the node cannot successful affiliate with the new upstream node, then the node goes into the "Out-of-Net" state at 442. Once the node has successfully joined with the new upstream node, then at 460, the node updates its stored network formation database to reflect the new tree-based topology and at 465 where the node informs its neighbor nodes of updates to the tree-based network topology.

Figure 8:
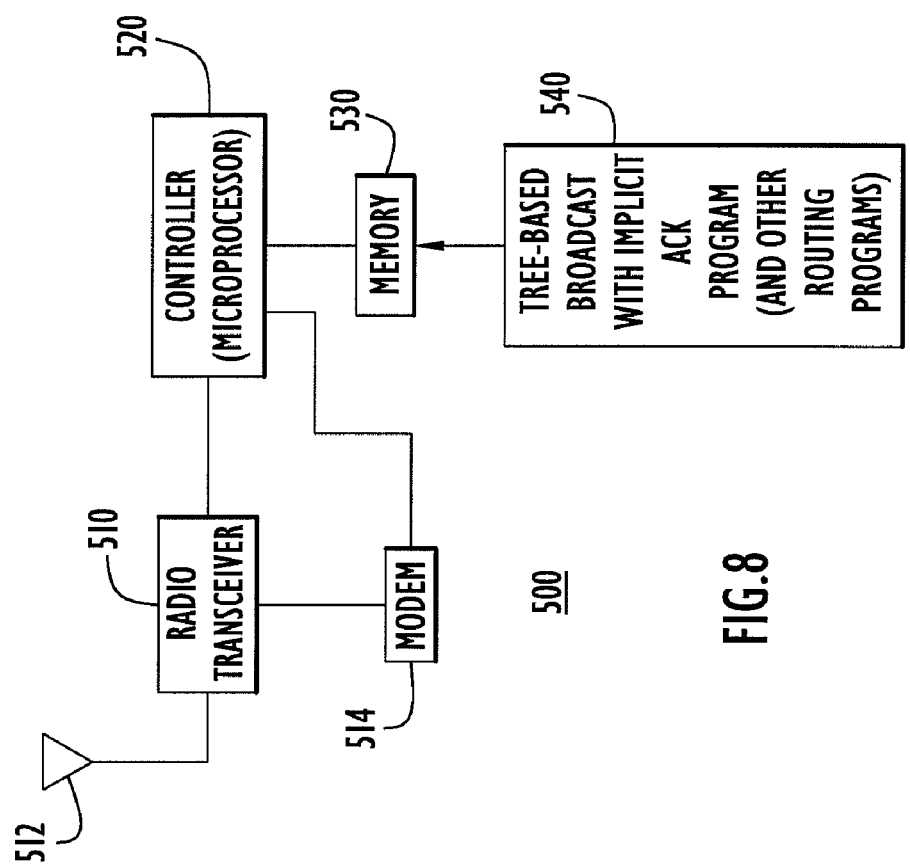
FIG. 8 is a block diagram of wireless communication device that may perform the broadcast protocol according to the present invention.

FIG. 8 illustrates a block diagram for a wireless communication device 500 that may function as a sensor node or C2 node in the wireless ad-hoc network described herein. The device The communication device 500 comprises a radio transceiver 510, a modem 514, a controller 520 and a memory 530. The radio transceiver 510 transmits and receives signals via an antenna 512 and the modem performs baseband signal processing (modulation and demodulation) of the transmit and receive signals. The controller 520 may be embodied by a microprocessor or other programmable processing device that executes a program stored in memory 530 for controlling operation of the communication device 500. For example, a tree-based broadcast with implicit ACK program 540 (as well as programs for the other processes described herein) may be stored in the memory 530 such that when the controller 520 executes the program 540, it performs the processes described above in connection with FIGS. 4-7. Alternatively, the controller 520 may be an application specific integrated circuit that is designed with logic to execute the functions of the program 540. The memory 530 stores the data for the tree-based topology that the device is aware of as a node in a network. For example, the memory 530 may store tree-based network topology data for an existing tree-based network comprising node identifier/addresses of other nodes in the network, indications of which nodes are upstream or downstream nodes, which nodes are in a sub-tree, the number of hops between the node and the root node, etc.

Figure 9:
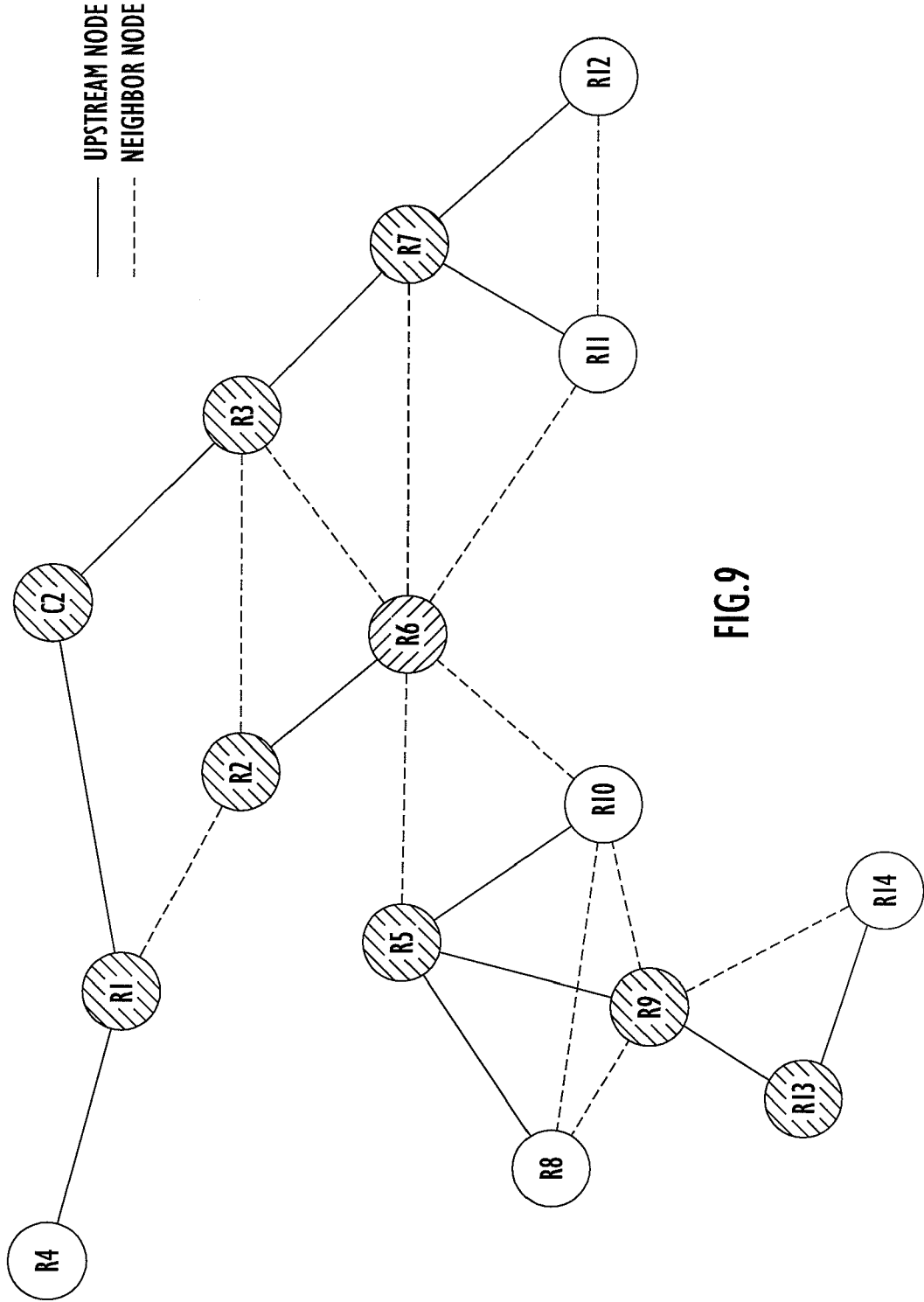
FIG. 9 is a block diagram of an exemplary tree-based network used for analyzing performance of the techniques according to the present invention.

With reference to FIGS. 9-14, a summary of performance analysis is provided to illuminate the effectiveness of the tree-based with "implicit ACK" procedures according to the present invention. FIG. 9 illustrates a 15-node network comprising a root node C2 and 14 sensor nodes R1, R2, . . . , R14.

With flooding, each node has a number of common nodes (=c) and will retransmit the broadcast packet up to MaxNumBcastTrials (=w) times. The probability of a successful broadcast transmission at the $i^{th}$ hop from C2 is:

$$P_S(i)=P_S(i-1)*\{1-[1-(1-P_f)^{2N}]^{C*W}\}$$

where $P_S(i-1)$ is the probability of success that nodes at $(i-1)^{th}$ Hops from the root node C2 will receive the broadcast packet and $P_f$ is the probability that a link failure causes a broadcast packet not to be delivered.

Performance of the four broadcast with "implicit ACK" schemes is estimated for the network topology shown in FIG. 9.

Figure 10:
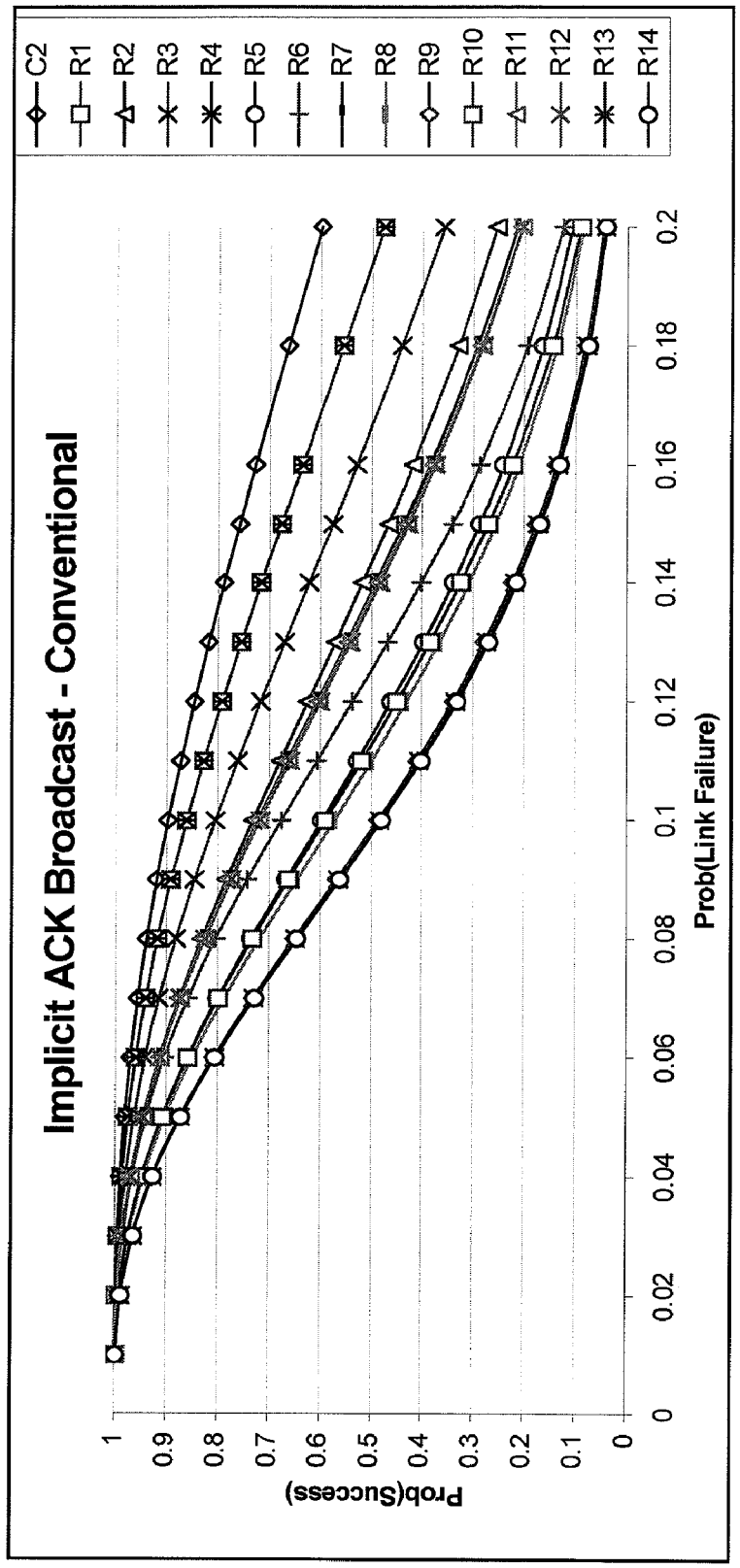
FIG. 10 illustrates performance plots for a conventional broadcast process in the network shown in FIG. 9.

FIG. 10 illustrates plots for performance using conventional broadcast with "implicit ACK". In this case, a local node generates its ACK list from neighbors by deleting the source node address. The C2 node starts to broadcast the message throughout the network. If any neighbor fails to rebroadcast, the sender retransmits up to w (=3 in this estimate) times. Node R6 has two common nodes R2 and R3. FIG. 10 illustrates the probability of success of a message ($P_s$) versus the probability of link failure ($P_f$ from 1% up to 20%) for all the nodes of the network shown in FIG. 9. The nodes that are farther from the C2 node have less probability of success ($P_s$), as expected.

Figure 11:
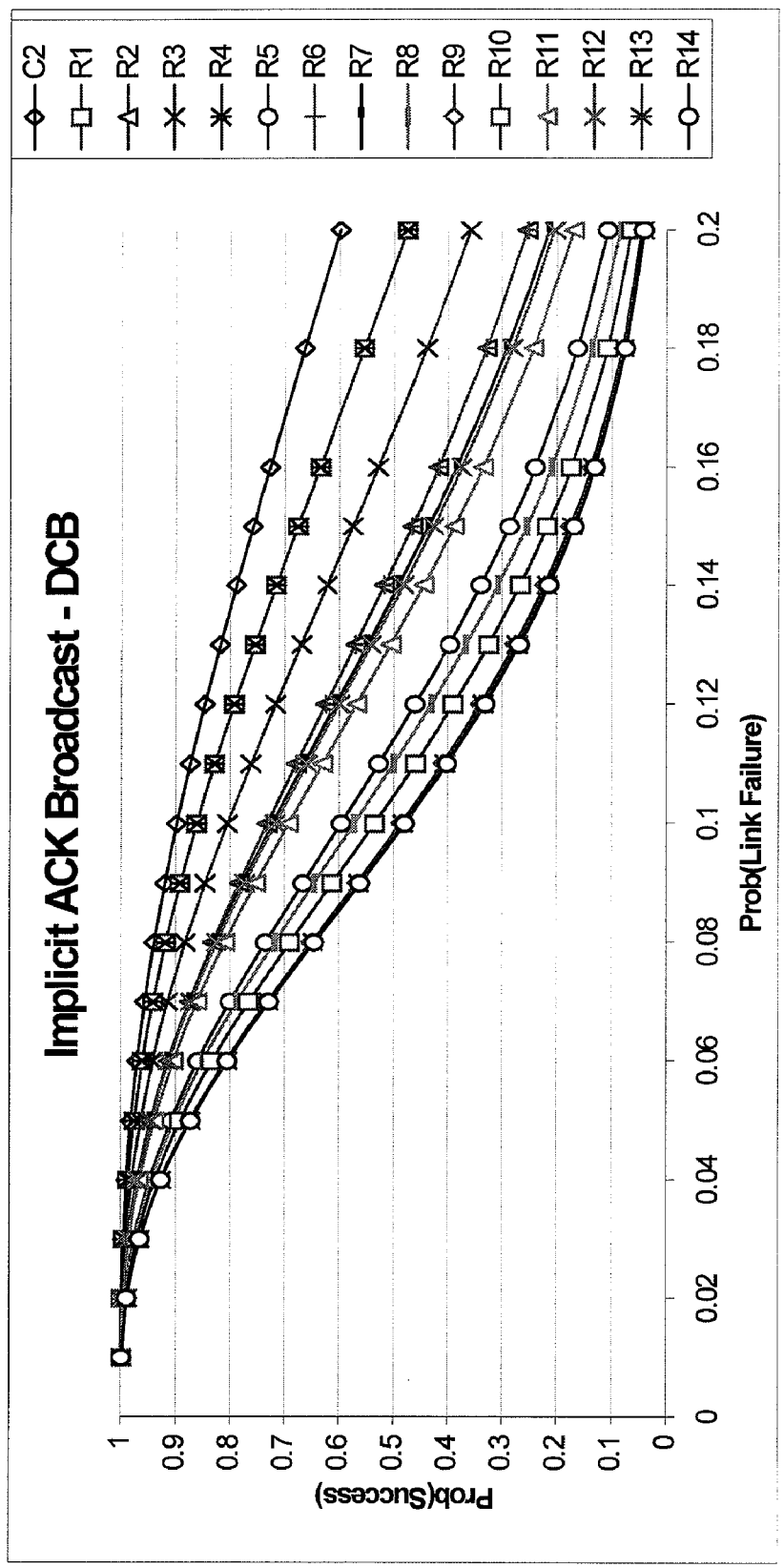
FIG. 11 illustrates performance plots for another conventional broadcast process in the network shown in FIG. 9.

FIG. 11 illustrates plots for performance using the well known double-covered broadcast (DCB) protocol that selects forwarding nodes to reduce the redundant broadcasts with k-hop neighbor information. Applying the simple DCB method to the network shown in FIG. 9, node R6 does not forward the broadcast message. Nodes R10 and R11 lose one common node (R6). FIG. 11 illustrates the probability of success of a message ($P_s$) versus the probability of link failure ($P_f$ from 1% up to 20%).

Figure 12:
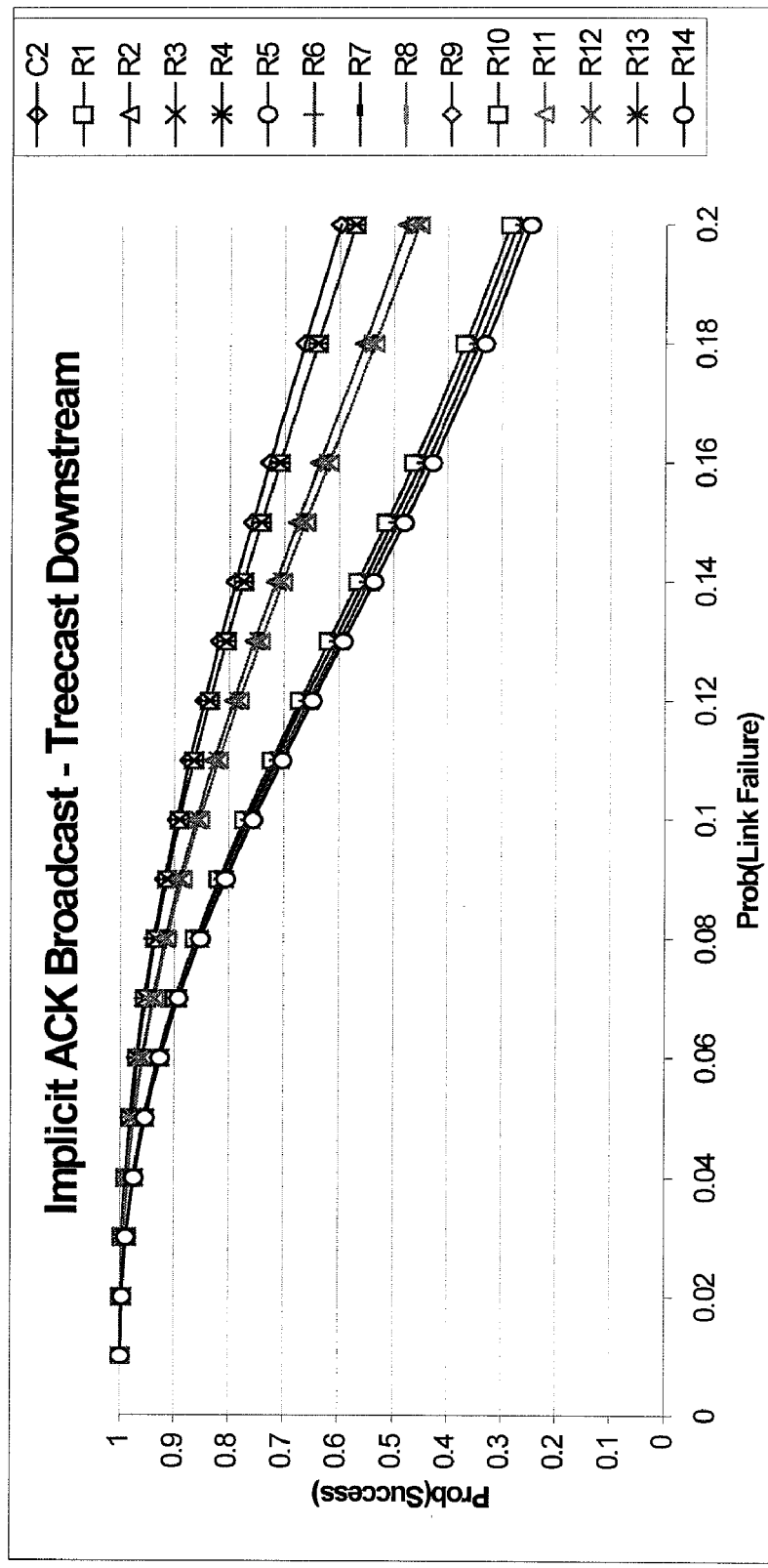
FIGS. 12 and 13 illustrate performance plots resulting from the tree-based broadcast process according to the present invention in the network of FIG. 9.
Figure 13:
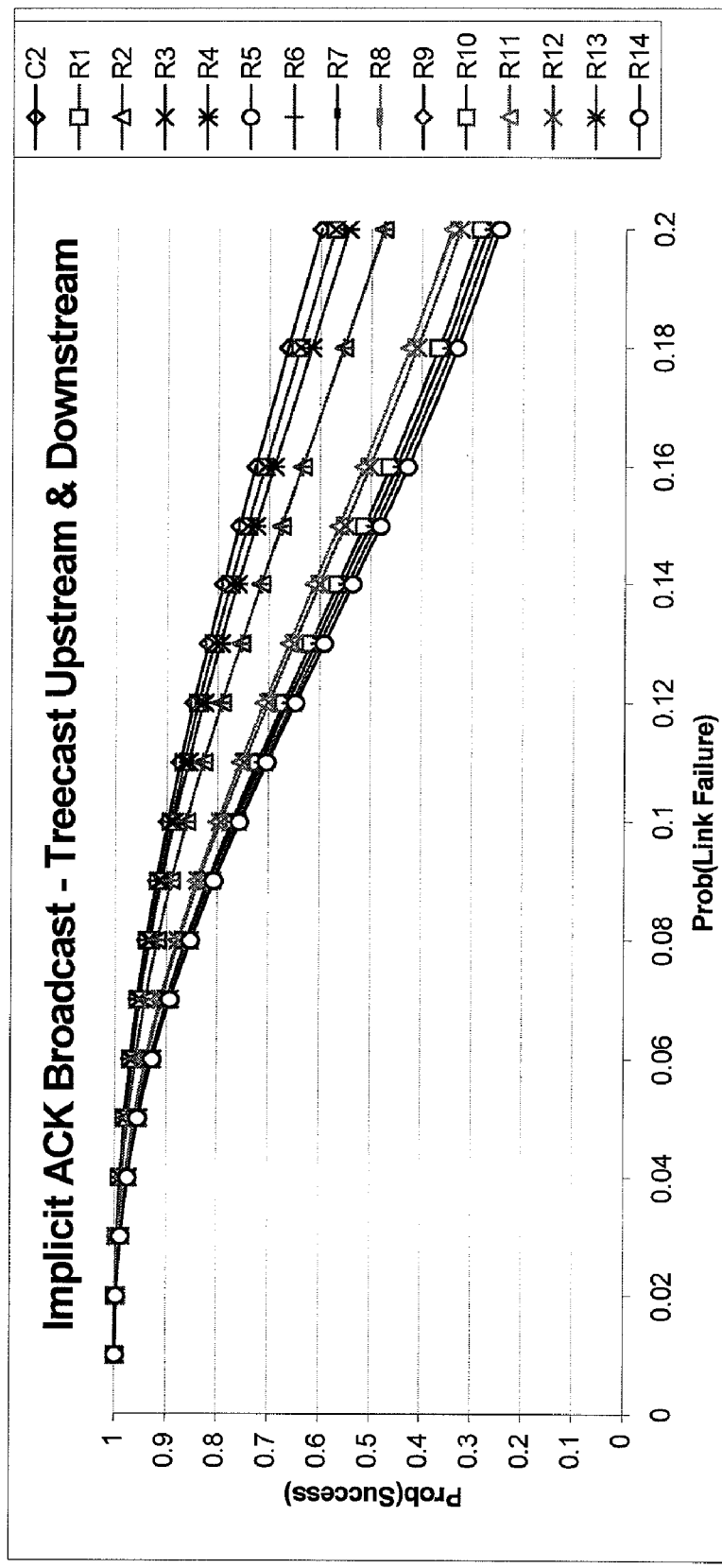

FIGS. 12 and 13 illustrate plots for performance of the tree-based broadcast with implicit ACK methodology according to the present invention. Assuming C2 broadcasts the message at the same location where the tree-based topology is built, the local node's ACK list is built by from a downstream node. The performance for this scenario is shown in FIG. 12. FIG. 13 illustrates the performance when a local node's ACK list is built from upstream and downstream nodes, caused by movement of the C2 node to a new location.

Figure 14:
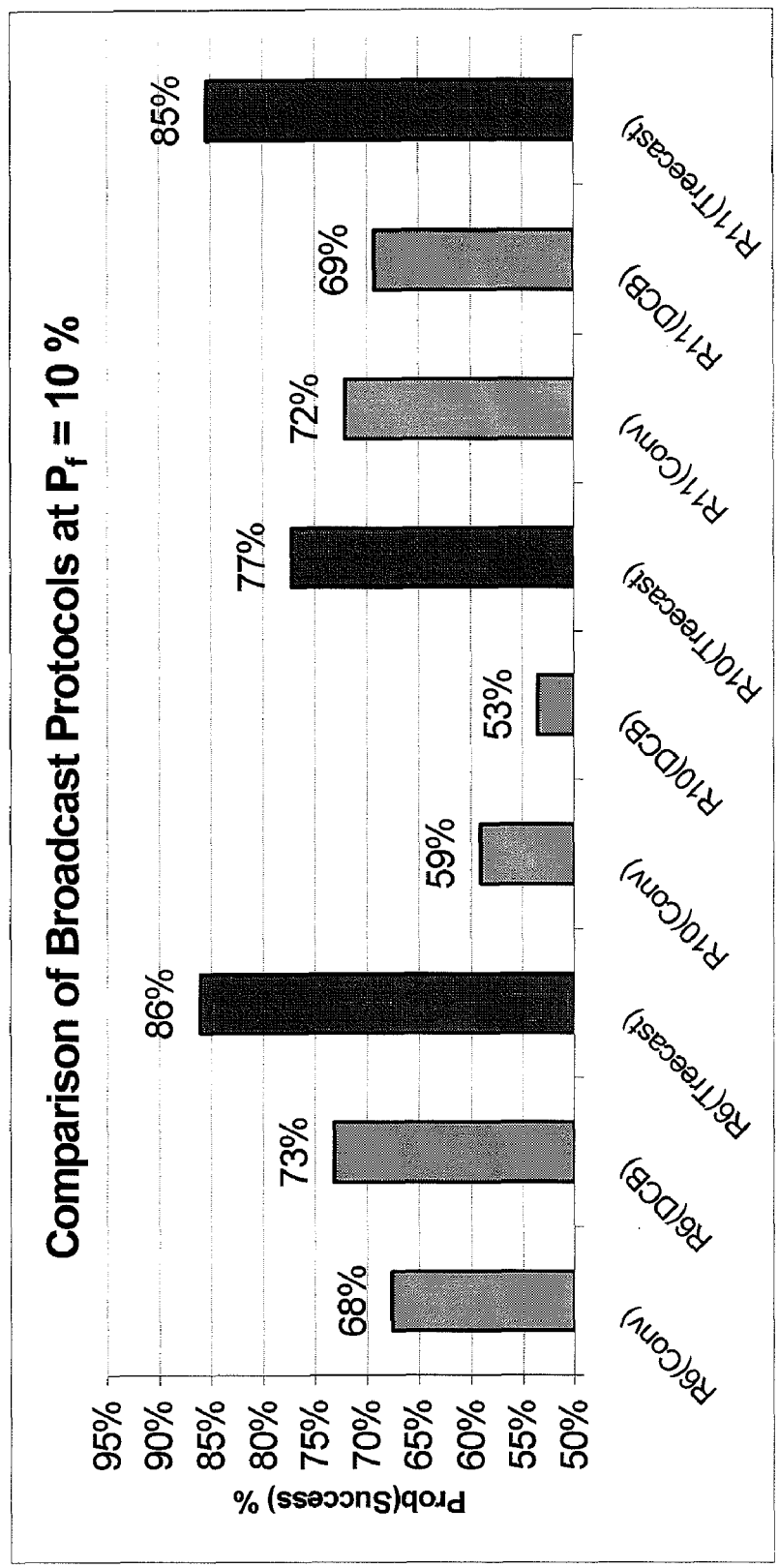
FIG. 14 illustrates a bar chart that compares a conventional broadcast process with the tree-based broadcast processing according to the present invention.

FIG. 14 illustrates a chart comparing performance of broadcast protocol of the present invention with the conventional broadcast protocols. FIG. 14 shows that the tree-based broadcast protocol technique according to the present invention is 13%, 24% and 16% better than the DCB method at nodes R6, R10 and R11, respectively, and is 19%, 18% and 13% better than the conventional broadcast method at nodes R6, R10 and R11, respectively.

In summary, according to the techniques of the present invention, a local node waits to perform broadcast commands ("Deactivate" or "Activate") based on the local node's HopCountToC2. This coordinated net formation based on the local node's HopCountToC2 prevents unnecessary local repair throughout the network. The "Deactivate" command starts for the farthest nodes from the C2 node (k-hops) and the next k−1 hops away nodes follow and so on, in a "bottom-up" manner. The "Activate" command starts net formation for the nearest nodes to the C2, then 1-hop away nodes follow and so on, in a "top-down" manner. The speed of net formation can be optimized by controlling the duration of this waiting period.

No technique is heretofore known in which cross-layer optimization is performed to coordinate network formation using a tree-based broadcast with "implicit ACK" protocol so that the network is stable and robust when the C2 may move about with respect to nodes of the network. The techniques according to the present invention prevent unnecessary exchanges of k-hop neighbor's information, lower energy consumption of the nodes, avoid racing problems caused by local repair procedures, and employ a re-route process that significantly reduces the OTA traffic. These techniques can be used in other coordinated network management operations through the sequential "bottom-up" and "top-down" procedures.

The techniques for the present invention are useful in any sensor network that uses a tree-based topology, including but not limited, to tactical (ground-based) UGS sensor networks, but to military ad-hoc sensor networks in general as well as any other commercial sensor network applications.

The system and methods described herein may be embodied in other specific forms without departing from the spirit or essential characteristics thereof. The foregoing embodiments are therefore to be considered in all respects illustrative and not meant to be limiting.

What is claimed is:

1. A method for broadcasting messages in an ad hoc wireless network having a tree-based architecture, comprising:
   a. receiving a message at a node in the network;
   b. determining whether the message is a broadcast message;
   c. when the message is a broadcast message, determining a source node of the broadcast message based on stored data at the node that represents an existing tree-based topology of the network;
   d. determining from the broadcast message a number of node hops to a root node for said source node and deriving therefrom a number of nodes from said root node to said node;
   e. comparing the number of node hops from said root node to said node with data stored at said node that represents the number of node hops between said root node and said node for said existing tree-based topology of the network;
   f. based on said (e) comparing, building a list of identifiers of other nodes in the network from which said node requires reception of a broadcast message as an implicit acknowledgment that said other nodes in the network have received said broadcast message; and
   g. re-broadcasting said broadcast message.

2. The method of claim 1, wherein when (e) comparing determines that the number of node hops from said root node to said node equals the number of node hops between said root node and said node for said existing tree-based topology of the network, said (f) building comprises adding an identifier of one or more downstream nodes with respect to said node from the existing tree-based topology of the network.

3. The method of claim 1, and further comprising determining whether said message originates from a host device and indicates that the root node is leaving the network, and if so, when said node is the root node generating and broadcasting a network deactivation message.

4. The method of claim 1, wherein (g) re-broadcasting comprises re-broadcasting said broadcast message after a re-broadcast delay time interval that is based on a first value and a second random value.

5. The method of claim 1, and further comprising determining when the received broadcast message is a deactivate message indicating that the root node is leaving the network, and wherein said (d) determining, (e) comparing, (f) building and (g) re-broadcasting are performed in order to re-broadcast said deactivate message to other nodes in order to notify other nodes in the network that the root node is leaving the network.

6. The method of claim 1, and further comprising determining when the received broadcast message at said node is a network activation message, and if so, said node determining whether it is the first time receiving said activation message.

7. The method of claim 1, and further comprising said node determining whether the message is a network activation message received from a host device, and if so, said node becomes the root node for a new tree-based topology.

8. The method of claim 1, further comprising maintaining a network formation once a route discovery process is determined based on the number of node hops to a root node for said source node.

9. The method of claim 1, wherein building a list of identifiers comprises building a list of identifiers based on a number of adjacent downstream nodes.

10. The method of claim 2, when (e) comparing determines that the number of node hops from said root node to said node does not equal the number of node hops between said root node and said node for said existing tree-based topology of the network, then further comprising determining whether an identifier of the source node of the received broadcast message is a node that is part of a sub-tree of said node in said existing tree-based topology, and if so, said (f) building comprises adding an identifier of one or more upstream nodes with respect to said node from the existing tree-based topology of the network.

11. The method of claim 4, and further comprising setting said first value to minimize collisions between re-broadcasted messages from other nodes.

12. The method of claim 4, wherein after said node re-broadcasts the broadcast message, further comprising waiting a time interval to allow for reception of the broadcast message from another node as an implicit acknowledgement that said other node received said broadcast message, and deleting from said list an identifier of said other node from which said node receives the broadcast message.

13. The method of claim 5, and further comprising said node deleting the stored data representing the existing tree-based topology of the network and waiting a reset time interval after which said node initiates a network formation procedure.

14. The method of claim 6, when it is the first time receiving said network activation message, said node executes a network formation process to build a new tree-based topology for the network, and wherein said (d) determining, (e) comparing, (f) building and (g) re-broadcasting are performed to re-broadcast the network formation message to other nodes to notify other nodes of the new tree-based topology for the network.

15. The method of claim 6, when it is not the first time receiving said network formation message, said node executes a re-routing procedure in order to prevent downstream nodes from executing local repair procedures.

16. The method of claim 7, and further comprising said node attempting to discover neighboring nodes by attempting to exchange packets with other nodes during a neighbor discovery time interval, and upon expiration of the neighbor discovery time interval, said node determining whether any neighbors are discovered.

17. The method of claim 10, when it is determined that the identifier of the source node of the received broadcast message is not part of a sub-tree of said node in said existing tree-based topology, then said (f) building comprises adding identifiers of all upstream nodes and downstream nodes with respect to said node from said existing tree-based topology of the network.

18. The method of claim 10, when said (e) comparing determines that the source node of the received broadcast message is a node that is not part of the existing tree-based topology of the network, said (f) building comprises building a list of identifiers of other nodes in the network that are neighbors of said node in the existing-tree based topology but excluding the source node.

19. The method of claim 12, wherein said re-broadcasting is performed up to a predetermined number of iterations until said list maintained by said node is empty.

20. The method of claim 13, wherein said waiting comprises waiting a reset time interval that is derived from a rebroadcast delay time interval, a maximum number of node hops to the root node in said existing tree-based topology and the number of node hops between said node and said root node, wherein said reset time interval allows time for other nodes in the network to delete stored data representing said existing tree-based topology.

21. The method of claim 15, and further comprising extracting from said network activation message a root node identifier, a source node identifier that identifies that node that transmitted the network activation message to said node and the number of node hops between the root node and said node, and waiting a reset delay time interval during which said node may receive neighbor discovery packets from other nodes.

22. The method of claim 16, when said node determines that no neighbors are discovered, said node sends a message back to the host device indicating that said node is isolated, and when said node determines that at least one neighboring node is discovered, then said node setting said number of hops to said root node to zero, and wherein said (d) determining, (e) comparing, (f) building and (g) re-broadcasting are performed in order to broadcast said network activation message to other nodes.

23. The method of claim 20, and further comprising ignoring any network activation messages received at said node from other nodes during said reset time interval.

24. The method of claim 20, wherein after initiating said network formation procedure, further comprising said node disabling a node affiliation procedure with respect to neighboring nodes for an affiliate delay time interval that is based on said re-broadcast delay time interval and the maximum number of hops to the root node.

25. The method of claim 21, wherein when during said reset delay time interval said node receives a neighbor discovery packet that contains a root node identifier that matches the root node identifier contained in said network activation message that said node received, then waiting a neighbor discovery time interval.

26. The method of claim 21, wherein when said node determines that no neighboring nodes are discovered during said reset delay time interval, then deleting any network topology data stored at said node and said node entering an out-of-network state.

27. The method of claim 25, wherein upon expiration of the neighbor discovery time interval said node selects an upstream node and determines whether the selected upstream node is the same as an existing upstream node for said node, and if so storing data for a new tree-based topology of the network and if the selected upstream node is different than the existing upstream node, then said node performs an affiliation procedure with said selected upstream node.

28. A method for re-broadcasting messages from a node in an ad hoc wireless network having a tree-based architecture, comprising:
  a. receiving a broadcast message at the node for re-broadcasting from the node to other nodes in the network;
  b. determining from the broadcast message a number of node hops between said node and a root node in the network, and comparing the number of node hops with data stored at said node that represents the number of node hops between said root node and said node for an existing tree-based topology of the network;
  c. based on said comparing, building a list of identifiers of other nodes in the network from which said node requires reception of the broadcast message as an implicit acknowledgment that said other nodes in the network have received said broadcast message; and
  d. re-broadcasting said broadcast message.

29. The method of claim 28, further comprising maintaining a network formation once a route discovery process is determined based on the number of node hops to a root node for said source node.

30. The method of claim 28, wherein building a list of identifiers comprises building a list of identifiers based on a number of adjacent downstream nodes.

31. A wireless communication device that operates as a node in an ad hoc wireless network having a tree-based architecture, the device comprising:
  a. a radio transceiver that transmits and receive signals;
  b. a modem that modulates baseband transmit signals and demodulates baseband receive signals;
  c. a memory that stores network topology data for an existing network; and
  d. a controller coupled to said modem and said memory, wherein the controller controls operation of said device as a node in the network, wherein when the device receives a broadcast message for re-broadcasting to other nodes in the network, said controller determines from the broadcast message a number of node hops to a root node for a source node, compares the number of node hops from said root node to said node with data stored at said node that represents the number of node hops between said root node and said node for said network topology, and, based on said network topology data, generates a list of identifiers of other nodes in the network from which reception of a broadcast message is required as an implicit acknowledgment that said other nodes in the network have received said broadcast message.

32. The wireless communication device of claim 31, wherein the controller re-broadcasts the broadcast message after a re-broadcast delay time interval that is based on a first value and a second random value, said first value being a value to minimize collisions between re-broadcasted messages from other nodes.

33. The wireless communication device of claim 31, wherein when the controller determines that the number of node hops from said root node to said node does not equal the number of node hops between said root node and said node for said existing tree-based topology of the network, the controller is further configured to determine whether an identifier of the source node of the received broadcast message is a node that is part of a sub-tree of said node in said existing tree-based topology, and if so, to add an identifier of one or more upstream nodes with respect to said node from the existing tree-based topology of the network.

34. The wireless communication device of claim 31, wherein the controller is configured to determine when the received broadcast message is a deactivate message indicating that the root node is leaving the network, and the controller is configured to perform the determine, compare, and generate operations to re-broadcast said deactivate message to other nodes in order to notify other nodes in the network that the root node is leaving the network.

35. The wireless communication device of claim 31, wherein the controller is configured to determine when the received broadcast message at said node is a network activation message, and if so, to determine whether it is the first time receiving said activation message.

36. The wireless communication device of claim 31, wherein the controller is configured to determine when it is the first time receiving the network activation message, to execute a network formation process to build a new tree-based topology for the network, and to perform the determine, compare, and generate the list operations to re-broadcast the network formation message to other nodes to notify other nodes of the new tree-based topology for the network.

37. The wireless communication device of claim 31, wherein the controller is configured to determine whether the message is a network activation message, and if so, to configure said node to become the root node for a new tree-based topology.

38. The wireless communication device of claim 33, where when the controller determines that the identifier of the source node of the received broadcast message is not part of a sub-tree of said node in said existing tree-based topology, the controller is configured to add identifiers of all upstream nodes and downstream nodes with respect to said node from said existing tree-based topology of the network.

39. The wireless communication device of claim 33, wherein when the controller determines that the source node of the received broadcast message is a node that is not part of the existing tree-based topology of the network, the controller is configured to generate the list of identifiers of other nodes in the network that are neighbors of said node in the existing-tree based topology but excluding the source node.

40. The wireless communication device of claim 34, wherein the controller is configured to delete stored data representing the existing tree-based topology of the network and wait a reset time interval after which the controller initiates a network formation procedure.

41. The wireless communication device of claim 35, wherein when the controller is configured to determine that it is not the first time receiving the network formation message, and to execute a re-routing procedure in order to prevent downstream nodes from executing local repair routines.

42. The wireless communication device of claim 40, wherein the controller is configured to, after initiating said network formation procedure, disable a node affiliation procedure with respect to neighboring nodes for an affiliate delay time interval that is based on said re-broadcast delay time interval and the maximum number of hops to the root node.

43. The wireless communication device of claim 41, wherein the controller is configured to extract from the network activation message a root node identifier, a source node identifier that identifies that node that transmitted the network activation message and the number of node hops between the root node and said node, and to wait a reset delay time interval during which said node may receive neighbor discovery packets from other nodes.

* * * * *

UNITED STATES PATENT AND TRADEMARK OFFICE
CERTIFICATE OF CORRECTION

| | | |
|---|---|---|
| PATENT NO. | : 7,916,666 B2 | |
| APPLICATION NO. | : 11/695879 | |
| DATED | : March 29, 2011 | |
| INVENTOR(S) | : Chang-June Yoon et al. | |

It is certified that error appears in the above-identified patent and that said Letters Patent is hereby corrected as shown below:

Column 2, line 60, replace "FIG. 3A illustrates" with -- FIGs. 3A and 3B illustrate --, and line 61, replace "process for a" with -- processes for a --.

Signed and Sealed this
Tenth Day of May, 2011

David J. Kappos
*Director of the United States Patent and Trademark Office*